United States Patent [19]
Kurtin

[11] Patent Number: 5,095,449
[45] Date of Patent: Mar. 10, 1992

[54] EXPANSION MODULE FOR COMPUTER PRINTER FONT CARTRIDGE

[76] Inventor: Stephen Kurtin, 3835 Kingswood Rd., Sherman Oaks, Calif. 91403

[21] Appl. No.: 632,530

[22] Filed: Dec. 24, 1990

[51] Int. Cl.$^5$ ............................................ G06H 15/00
[52] U.S. Cl. ..................................... 395/110; 364/930
[58] Field of Search .............................. 364/518–520, 364/930 MS, 235 MS, 930.5 MS, 954.3 MS, 954.5 MS, 243.7 MS, 929.4 MS, 929.71 MS, 964.3 MS, 964 MS, 954.2 MS; 346/154; 400/72, 61, 66, 69; 340/735; 365/63

[56] References Cited

U.S. PATENT DOCUMENTS

| | | | |
|---|---|---|---|
| 4,660,999 | 4/1987 | Tsuneki | 400/61 |
| 4,826,332 | 5/1989 | Ukai et al. | 400/61 |
| 4,908,637 | 3/1990 | Chung et al. | 364/519 |

Primary Examiner—Arthur G. Evans
Attorney, Agent, or Firm—Saul Epstein

[57] ABSTRACT

A computer printer font cartridge expansion module having i) a connector to couple to a printer font data bus receptacle, ii) a receptacle for accepting a font cartridge, and iii) ROM for storing character information to provide additional font capability when the assembly formed by a font cartridge and an expansion module is plugged into a computer printer. The printer font data bus is extended through the expansion module to the attached font cartridge. The addresses of the ROM in the expansion module are in a block of addresses at the top of the range of addresses addressable by the font data bus. Alternatively, switching means are provided for switching the printer font data bus between the expansion module and an attached font cartridge. Also provided are securing means for attaching a font cartridge to the expansion module. The securing means comprises a pair of spring steel strips, one end of each bearing on a ramped finger actuated slide button, and the other end being sharpened and made to bear against the interior of the font cartridge by the action of the ramp.

10 Claims, 2 Drawing Sheets

EXPANSION MODULE FOR COMPUTER PRINTER FONT CARTRIDGE

BACKGROUND OF THE INVENTION

In many personal computer systems, information as to character shapes and the like is stored at, and supplied by, the printer. A wide variety of type styles and sizes is available and in general use. In order that each user be able to have the fonts that he or she deems desirable without the necessity of building an excessive amount of font data into each printer, replaceable font cartridges are commonly used, each cartridge containing the character information corresponding to a few fonts. When different fonts are desired, the existing cartridge is removed and a different one plugged in. Hence, a user need not purchase a large number of unwanted fonts in order to obtain the fonts he or she desires to use. Most printers in common use, however, have one or at most two receptacles for plugging in cartridges, which severely limits the selection of fonts available at any one time. This limitation is even more severe in practice than it appears, since commercially available font cartridges seldom utilize a large percentage of the font data address space capability of the printer font data bus. Also, since the manufacturers of font cartridges decide which combinations of fonts to put in font cartridges, it may not be possible for a user to have the selection of fonts he or she desires available on line at any one time, irrespective of how many cartridges are owned.

It is an object of the present invention to expand the on line font capability of printers used with personal computers by providing an expansion module for a font cartridge which permits installation of a user-specific selection of fonts in a printer which uses font cartridges as a source of character shape information.

It is a further object of the present invention to permit expansion of the number and/or variety of fonts available on line in a personal computer printer while utilizing previously purchased font cartridges.

It is a still further object of the invention to provide a font cartridge expansion module which can be used either in an expanded mode (in conjunction with a font cartridge) or used by itself (without expansion) as a stand alone font cartridge.

Yet another object of the invention is to provide a finger operated latching system for securing an expansion module to a font cartridge so that a font cartridge and attached expansion module can be conveniently inserted and removed from a printer as a unit.

SUMMARY OF THE INVENTION

The present invention consists of an expansion module—into which a commercially available font cartridge can be plugged—and which plugs into the font cartridge receptacle of a computer printer. The expansion module includes a novel latching means which attaches the font cartridge to the expansion module so that the assembly can be conveniently plugged into, and unplugged from, the printer as a unit. This is an important feature since for damage prevention and other reasons, the cartridge receptacle on most printers is recessed several inches, and for similar reasons the expansion module should be made as short as possible. Hence, when the expanded font cartridge is installed, the expansion module will normally be completely within the printer and in order to make removal convenient, it and the font cartridge should be one assembly. In an alternative unexpanded mode of operation, i.e., when the expansion module is used by itself as a stand alone font cartridge, a "dummy" cover is installed in place of a font cartridge to provide protection for the module and to provide a "handle" for installation and removal.

Within the expansion module is a circuit board which has an edge connector at one end, for plugging into the font cartridge receptacle of a printer, and a receptacle at the other end, for receiving the edge connector of a printer font cartridge. The connector and receptacle within the expansion module are electrically connected so that the printer font data bus (which appears at the printer font cartridge receptacle) will be coupled through to the font cartridge. The circuit board also contains sufficient read only memory (ROM) and other circuitry to store character information about one or more fonts, as desired. This information, as well as the information on the font cartridge plugged in to the expansion module, can be accessed by the printed through the font data bus.

When an expansion module with font cartridge attached is plugged into a printer, all of the fonts stored in the font cartridge and in the expansion module are available for use, so long as the total address limit of the printer font data bus is not exceeded. In an alternative embodiment of the invention, printer control or "escape" sequences are utilized to switch the font data bus between the font cartridge and one or more segments of the expansion module ROM. This arrangement permits access to more addresses than can be directly addressed.

DETAILED DESCRIPTION OF THE INVENTION

Figure 1:
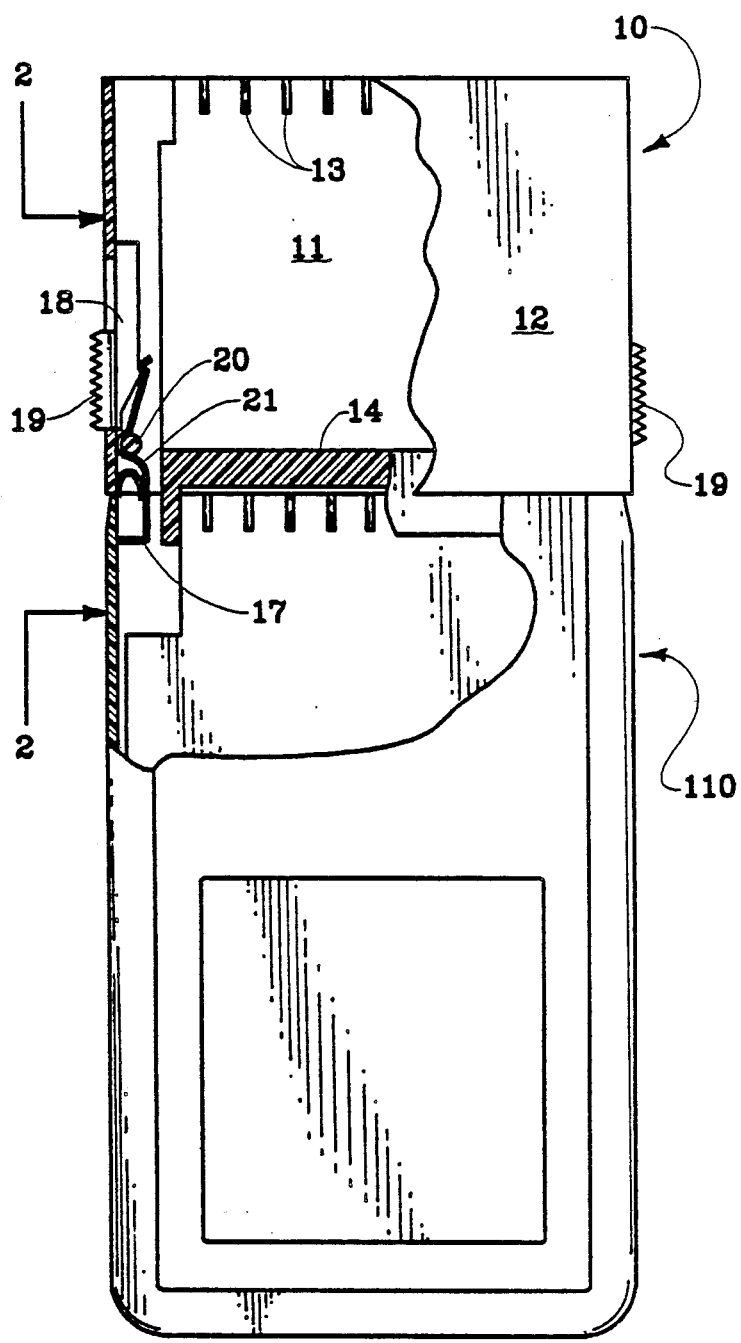
FIG. 1 is a partly broken away plan view of the invented expansion module with a font cartridge shown attached thereto.
Figure 2:
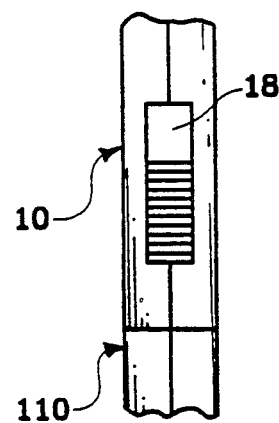
FIG. 2 is a fragmentary side view of the assembly of FIG. 1 in the region between the arrows 2—2.

FIG. 1 shows a partly broken away plan view of a presently preferred embodiment of the invented font cartridge expansion module 10, with a standard printer font cartridge 110 plugged into it. The expansion module includes a circuit board 11 which is enclosed in a protective case 12. The case 12 preferably has substantially the same external cross section size and shape as the font cartridge 110. An edge connector 13 is at one end of the circuit board 11, and a receptacle 14 (shown partly in cross section) at the other. The ends of the case 12 are open to provide access to the connector and receptacle. The configuration of the openings and the locations of the connector and receptacle with respect to the ends of the case are such that the connector will be able to be plugged into a printer font cartridge receptacle, and a font cartridge can be plugged into the expansion module receptacle. Means, as will be described below, are provided to secure the font cartridge 110 to the expansion module 10 so that the assembly can be unplugged from a printer without separation.

Figure 4:
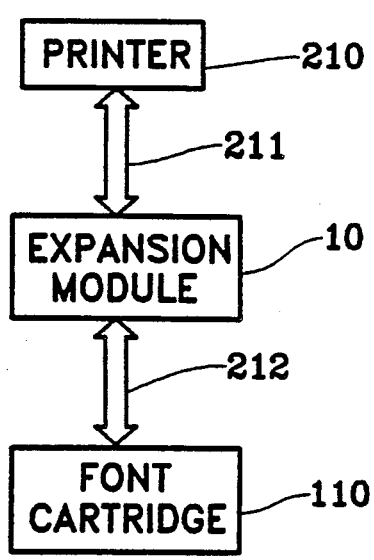
FIG. 4 is a simplified block diagram showing the interconnections between a printer, the invented expansion module, and a printer font cartridge.

The printer font data bus, indicated in FIG. 4 by the numeral 211, is coupled to the expansion module through connector 13. The contacts of connector 13 are electrically connected to the corresponding contacts of receptacle 14 so as to extend the font data bus through the expansion module to the font cartridge plugged into it. The font data bus extension to the font cartridge is indicated by numeral 212. Character information can thus be obtained by the printer from the font cartridge in the same manner as if the expansion module were not present.

Sufficient read only memory (ROM) (not shown in FIG. 1) is included on the circuit board 11 to store the character information desired to be stored in the expansion module. The ROM is coupled to the font data bus 211 which passes through the module, giving the printer access to the information stored in the ROM. In order to avoid addressing conflicts between the font cartridge and the expansion module, the address utilized by the expansion module are different from those utilized by the associated font cartridge. For some printers this can be assured by assigning the addresses for the expansion module ROM at the high end of the available range of addresses.

Commercially available font cartridges, as noted in the Summary section above, usually use a small part of the available addresses and hence a substantial number of addresses is normally available for use by an expansion module. A typical printer, for example, may have a capability of addressing 512K 16 bit words of ROM memory through the font data bus. Commercial font cartridges rarely use more than half of the available addresses; some use as little as 64K. The addresses used are usually in a block starting at zero and ending at the address corresponding to the amount of character information stored in the cartridge. That is, if a particular font cartridge contained 128K of character information, the addresses used would be from 0 to 128K. In this case the addresses between 128K and 512K could be used by an expansion module. To permit use with a variety of commercially available printer font cartridges, it would be prudent to limit the memory in the expansion module to a lesser amount, say 256K. An expansion module having this amount of ROM would utilize the addresses from 256K to 512K (assuming a printer whic has a 512K font data bus). It will be recognized that expansion modules with differing amounts of ROM for use with different classes of printer font cartridges can be made. The only limitation is that the total number of addresses in an expansion module and its associated font cartridge cannot exceed the addressing capability of the printer font data bus.

Figure 5:
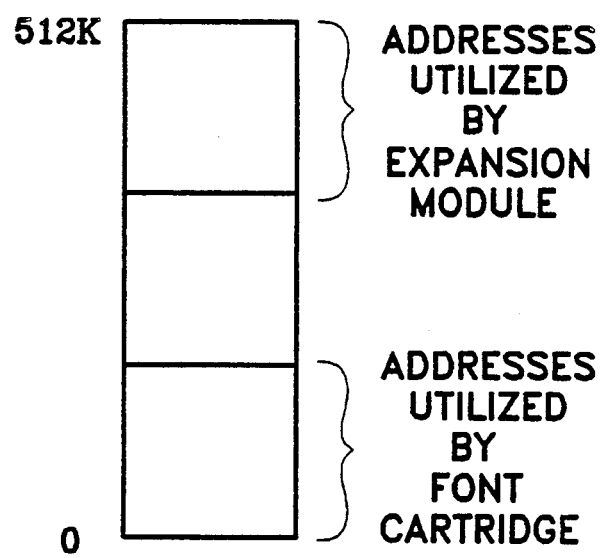
FIG. 5 illustrates the organization of the memory in a combination of the invented expansion module and a printer font cartridge.

FIG. 5 illustrates how the font data bus addressing is organized in accordance with the principles of the present invention. As can be seen, the expansion module and the font cartridge utilize different portions of the available addresses, and so long as the total number of words of character information stored is less than the total number of addresses available on the font data bus, no conflict will arise.

Figure 6:
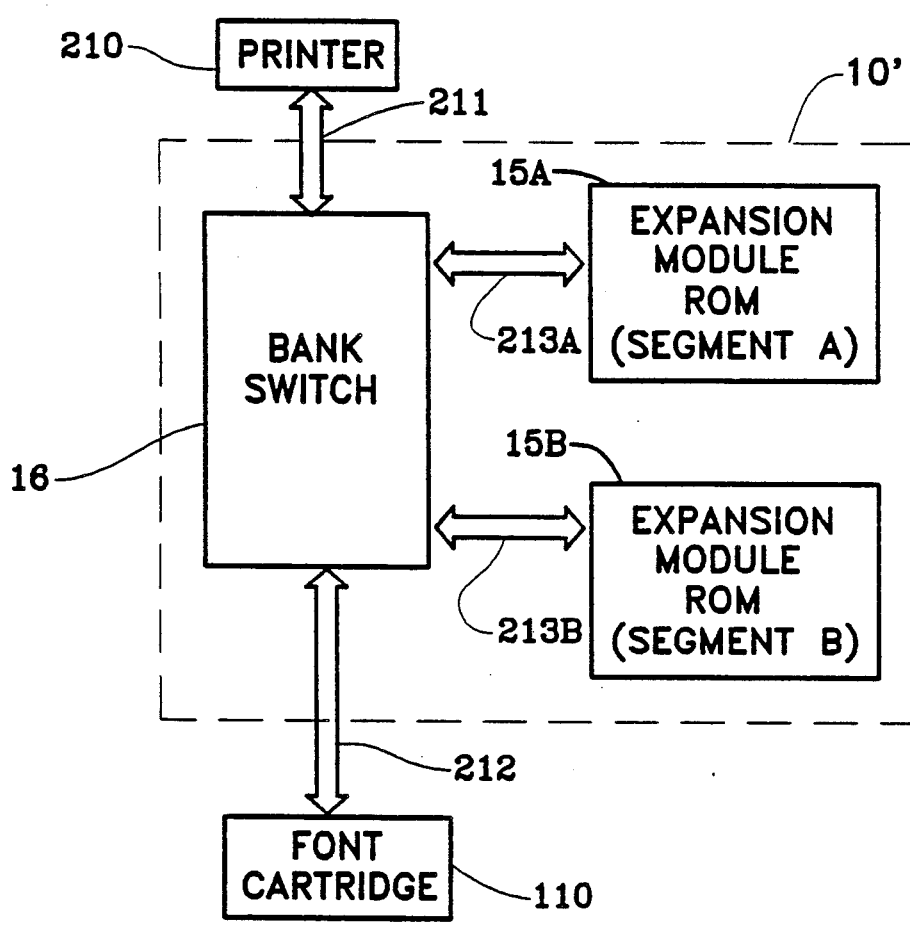
FIG. 6 is a simplified block diagrams showing the interconnections between a printer, an alternative embodiment of the invented expansion module, and a printer font cartridge.

FIG. 6 illustrates an alternative embodiment of the invention which provides a means to address more character information than can normally be addressed over a particular sized font data bus. In this embodiment, a bank switch 16 is used which incorporates logic elements which allow it to recognize control signals ("escape sequences") on the font data bus and, in response thereto, switch the font data bus between a font cartridge and one or more segments of ROM in the expansion module. Because the font data bus is coupled to only one source of font data at a time, the addresses used for accessing the font data in each segment of the expansion module can be the same as those used for the font data in the font cartridge.

In the embodiment of FIG. 6, the font data bus is coupled to a bank switch 16 which is capable of switching the bus among the segments 15A and 15B of the expansion module ROM, and the ROM in font cartridge 110. Predetermined escape sequences applied to the font data bus 211 are used to cause bank switch 16 to couple font data bus extension 212, 213A, or 213B, as desired, to the incoming bus 211. All of the addressing capability of the font data bus can therefore be utilized by each of the connected ROM segments. It will be recognized that any number of ROM segments can be included in expansion module 10' as desired, two segments being shown for illustrative purposes.

Figure 3:
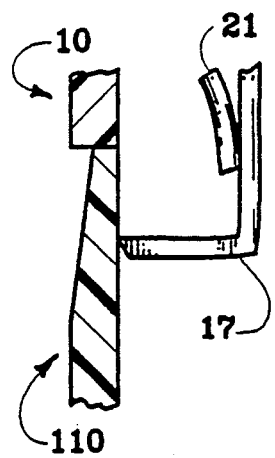
FIG. 3 is an enlarged fragmentary view of the means used to retain a printer font cartridge to the invented expansion module.

Font cartridge 110 is held to the expansion module 10 by two spring catches 17. Only one of the catches can be seen in the drawings, the other being located symmetrically on the opposite side of the module and hidden by case 12. Each catch is actuated by a ramp on slide button 18. Slide button 18 rides in a slot cut in the side of case 12, and is operated by finger pressure applied to the serrated section 19 on the button. When slide button 18 is slid down so that the rounded end of catch 17 slides up the ramp, the opposite end of the catch is forced against the inside of the case of font cartridge 110. The end of catch 17 is beveled as shown in FIG. 3 so that it bites into the case slightly and securely holds font cartridge 110 and expansion module 10 together. The catch 17, which is preferably fabricated from spring steel strip stock, has sufficient stiffness that when in lock position it will bite into the font cartridge slightly, but not break it. Pin 20 acts as a pivot around which catch 17 turns. Leaf spring 21 provides a restoring force to cause the catch to release when the slide button is retracted.

I claim:

1. A font cartridge expansion module for a computer printer which comprises:

a case;

a circuit board within said case, said circuit board having an edge connector on one end for plugging into a font data bus receptacle on a computer printer, and a receptacle on the other end for receiving the edge connector of a font cartridge, the contacts on the edge connector on said circuit board being connected to corresponding contacts of the receptacle on said circuit board; and read only memory means on said circuit board connected to the contacts of said edge connector on said circuit board.

2. A font cartridge expansion module as recited in claim 1 where the addresses of said read only memory are in a block of addresses ending with the highest address addressable by the font data bus of said printer.

3. A font cartridge expansion module as recited in claim 1 where the addresses of said read only memory are in a block of addresses between the highest address of the read only memory in an attached font cartridge and the highest address addressable by the font data bus of said printer.

4. A font cartridge expansion module as recited in claim 1 and further including means responsive to predetermined signals appearing on said font data bus for switching said font data bus between read only memory in said expansion module and read only memory in an attached font cartridge.

5. A font cartridge expansion module as recited in claim 1 and further including means responsive to predetermined signals appearing on said font data bus for switching said font bus among one or more segments of read only memory in said expansion module and read only memory in an attached font cartridge.

6. A font cartridge expansion module as recited in claim 1 and further including means for securing a font cartridge to said case.

7. A font cartridge expansion module as recited in claim 6 where said securing means includes a pair of catches attached to said expansion module, each having a sharpened edge for engaging the interior of a font cartridge case.

8. A font cartridge expansion module as recited in claim 7 where the force applied to said sharpened edges is applied by a spring member.

9. A font cartridge expansion module as recited in claim 6 where said securing means comprises:
  a pair of finger actuated slide buttons, each having a ramped region;
  a pair of compliant catches each having a sharp edge for engaging the interior of a font cartridge case and a rounded portion for engaging the ramped region of one of said slide buttons.

10. A font cartridge expansion module as recited in claim 9 and further including a pair of stationary members attached to the case of said expansion module about which was catches rotate.

* * * * *